(12) United States Patent
Kang et al.

(10) Patent No.: US 11,513,712 B2
(45) Date of Patent: Nov. 29, 2022

(54) METHOD FOR STORAGE MANAGEMENT, DEVICE AND COMPUTER PROGRAM PRODUCT

(71) Applicant: EMC IP Holding Company LLC, Hopkinton, MA (US)

(72) Inventors: Jianbin Kang, Beijing (CN); Geng Han, Beijing (CN); Jibing Dong, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 16/991,472

(22) Filed: Aug. 12, 2020

(65) Prior Publication Data

US 2021/0342085 A1    Nov. 4, 2021

(30) Foreign Application Priority Data

Apr. 30, 2020  (CN) .......................... 202010364357.3

(51) Int. Cl.
*G06F 11/20*  (2006.01)
*G06F 3/06*   (2006.01)

(52) U.S. Cl.
CPC ............ *G06F 3/0647* (2013.01); *G06F 3/064* (2013.01); *G06F 3/0619* (2013.01); *G06F 3/0653* (2013.01); *G06F 3/0689* (2013.01); *G06F 11/2094* (2013.01); *G06F 2201/82* (2013.01)

(58) Field of Classification Search
CPC .. G06F 11/2094; G06F 3/0647; G06F 3/0653; G06F 3/064; G06F 3/0616; G06F 3/0689; G06F 2201/82; G06F 11/1088; G06F 11/1092

See application file for complete search history.

(56) References Cited

U.S. PATENT DOCUMENTS

| | | | |
|---|---|---|---|
| 7,107,491 B2 | 9/2006 | Graichen et al. | |
| 7,373,559 B2 | 5/2008 | Guha | |
| 8,639,877 B2 | 1/2014 | Benhase et al. | |
| 9,436,571 B2 * | 9/2016 | Slik ..................... | G06F 11/2058 |
| 10,289,336 B1 * | 5/2019 | Liu ........................ | G06F 3/0619 |
| 11,209,988 B2 | 12/2021 | Lyu | |
| 2010/0262792 A1 * | 10/2010 | Hetzler ................. | G06F 11/008 711/156 |
| 2012/0110376 A1 * | 5/2012 | Dreifus ................. | G11C 29/76 711/E12.008 |

(Continued)

*Primary Examiner* — Yolanda L Wilson
(74) *Attorney, Agent, or Firm* — BainwoodHuang (57) ABSTRACT

Techniques for storage management involve: determining expected usage time of a first storage disk in a set of storage disks, at least a part of the set of storage disks being configured to form at least one redundant array of independent disks (RAID); moving data in a first storage block, associated with a first RAID in the at least one RAID, in the first storage disk to a second storage block in a second storage disk in the set of storage disks based on a determination that the expected usage time is less than a predetermined threshold value; and replacing the first storage block with the second storage block, so that the second storage block is associated with the first RAID. Based on this manner, the stability of a storage system can be improved.

18 Claims, 4 Drawing Sheets

(56) References Cited

U.S. PATENT DOCUMENTS

| | | | | |
|---|---|---|---|---|
| 2014/0201576 A1* | 7/2014 | Wu | .................... | G06F 11/2094 |
| | | | | 714/47.2 |
| 2018/0060230 A1* | 3/2018 | Kankani | ............. | G06F 12/0246 |
| 2019/0220193 A1* | 7/2019 | Yamamoto | ............ | G06F 3/0674 |
| 2020/0371693 A1* | 11/2020 | Lyu | ....................... | G06F 3/0644 |

* cited by examiner

METHOD FOR STORAGE MANAGEMENT, DEVICE AND COMPUTER PROGRAM PRODUCT

CROSS-REFERENCE TO RELATED APPLICATION

This application claims priority to Chinese Patent Application No. CN202010364357.3, on file at the China National Intellectual Property Administration (CNIPA), having a filing date of Apr. 30, 2020, and having "METHOD FOR STORAGE MANAGEMENT, DEVICE AND COMPUTER PROGRAM PRODUCT" as a title, the contents and teachings of which are herein incorporated by reference in their entirety.

TECHNICAL FIELD

Embodiments of the present disclosure relate to the field of computers, and more particularly, to a method, a device, and a computer program product for storage management.

BACKGROUND

In a storage system based on a redundant array of independent disks (RAID), if a storage disk fails, the storage system can recover data in the failed disk by using data in other storage disks. However, the situation where a plurality of storage disks fail at the same time may still occur, and such a failure may result in that some data is lost and cannot be effectively recovered. Therefore, how to reduce the risk caused by storage disk failure becomes a focus of attention at present.

SUMMARY OF THE INVENTION

Embodiments of the present disclosure provide a solution for storage management.

According to a first aspect of the present disclosure, there is proposed a storage management method. The method includes: determining expected usage time of a first storage disk in a set of storage disks, at least a part of the set of storage disks being configured to form at least one redundant array of independent disks (RAID); moving data in a first storage block, associated with a first RAID in the at least one RAID, in the first storage disk to a second storage block in a second storage disk in the set of storage disks based on a determination that the expected usage time is less than a predetermined threshold value; and replacing the first storage block with the second storage block, so that the second storage block is associated with the first RAID.

According to a second aspect of the present disclosure, there is proposed a device for storage management. The device includes: at least one processing unit; and at least one memory coupled to the at least one processing unit and storing instructions for execution by the at least one processing unit, wherein the instructions, when executed by the at least one processing unit, cause the device to perform actions, and the actions include: determining expected usage time of a first storage disk in a set of storage disks, at least a part of the set of storage disks being configured to form at least one RAID; moving data in a first storage block, associated with a first RAID in the at least one RAID, in the first storage disk to a second storage block in a second storage disk in the set of storage disks based on a determination that the expected usage time is less than a predetermined threshold value; and replacing the first storage block with the second storage block, so that the second storage block is associated with the first RAID.

In a third aspect of the present disclosure, there is provided a computer program product. The computer program product is stored on a non-transitory computer storage medium and contains machine-executable instructions which, when executed in a device, cause the device to perform any step of the method described according to the first aspect of the present disclosure.

The summary part is provided to introduce a selection of concepts in a simplified manner, which will be further described in the following detailed description. The summary part is neither intended to identify key features or essential features of the present disclosure, nor intended to limit the scope of the present disclosure.

BRIEF DESCRIPTION OF THE DRAWINGS

The foregoing and other objectives, features, and advantages of the present disclosure will become more apparent from more detailed description of the example embodiments of the present disclosure in conjunction with the accompanying drawings. In the example embodiments of the present disclosure, like reference numerals usually represent like components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Preferred embodiments of the present disclosure are shown in the accompanying drawings. However, it should be understood that the present disclosure may be implemented in various forms and should not be limited by the embodiments described here. Instead, the embodiments are provided to make the present disclosure more thorough and complete and to fully convey the scope of the present disclosure to those skilled in the art.

The term "include" and its variants as used herein indicate open inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Example Storage System

In a RAID-based storage system, one RAID may include storage blocks from a plurality of storage disks, and the plurality of storage disks may also constitute a plurality of independent RAIDs. Since each storage disk has a certain write/erase upper limit, after the number of writing/erasing on one storage disk reaches the upper limit, the storage disk may fail, which is also called storage disk wear.

In the RAID-based storage system, the storage system always evenly distributes 10 to all the storage disks, such that these storage disks may reach the write/erase upper limit at the same time, which may cause a plurality of storage disks to fail at the same time. Considering that RAIDs can generally allow the failure of one or two storage disks through a data redundancy technology, failure of the plurality of storage disks may bring great data risks to the storage system, which is unacceptable.

For the above and other potential problems, the embodiments of the present disclosure propose a storage management solution. In the solution, the stability of a storage system is improved by effectively predicting the remaining life of storage disks and performing data migration in advance.

For a better understanding of a storage management process according to the embodiments of the present disclosure, a basic architecture of the RAID-based storage system will be first introduced below.

Figure 1:
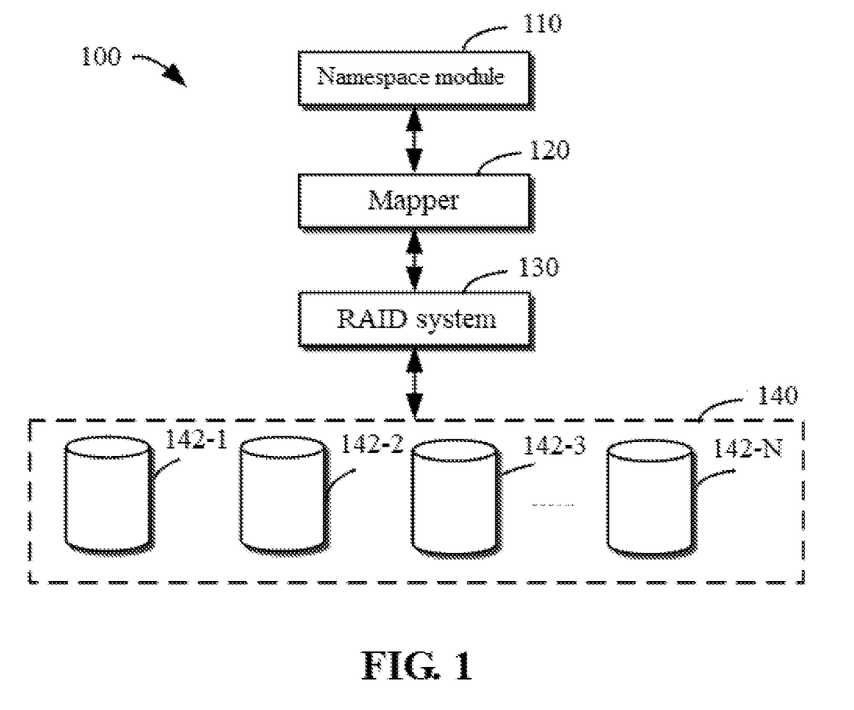
FIG. 1 shows a schematic diagram of an example storage system in which the embodiments of the present disclosure may be implemented.

FIG. 1 shows a schematic diagram of example storage system 100 in which the embodiments of the present disclosure may be implemented. As shown in FIG. 1, storage system 100 includes hardware storage pool 140 which includes a plurality of storage disks 142-1, 142-2, 142-3, . . . , 142-N (N is an integer greater than or equal to 1), etc. for providing a physical storage space of storage system 100. For ease of discussion, these storage disks are sometimes referred to collectively or respectively as storage disks 142. Storage disk 142 may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a blu-ray disk, a serial-attached small computer system Interface (SCSI) storage disk (SAS), a serial advanced technology attachment (SATA) storage disk, any other magnetic storage devices and any other optical storage devices, or any combination thereof.

RAID system 130 in storage system 100 is established over a plurality of storage disks 142 to organize physical storage spaces of storage disks 142 by using an RAID algorithm. RAID system 130 provides a flat physical address space to mapper 120 of storage space 100. Mapper 120 is configured to manage mapping between a physical address and a logical address of storage system 100. Mapper 120 provides a flat linear logical address space to namespace module 110. Namespace module 110 utilizes the logical address space provided by the mapper and may call an application program interface (API) of mapper 120 to obtain the mapping from the logical address to the physical address. When an I/O operation is performed on storage system 100, an I/O request from a user is received by namespace module 110 and transmitted to mapper 120. Mapper 120 searches for a physical address (the address where data is written or the address where the data is read) of data directed to by the I/O request and initiates I/O to RAID system 130, so that RAID system 130 performs an actual I/O operation on storage disks at the rear end.

It should be understood that FIG. 1 only schematically shows units, modules, or components in storage system 100 related to the embodiments of the present disclosure. Various components shown in FIG. 1 are merely an example storage system management architecture, and in other RAID-based storage systems, there may be other architecture division manners, other units, modules, or components for other functions, and the like. Accordingly, the embodiments of the present disclosure are not limited to specific devices, units, modules, or components depicted in FIG. 1, but are generally applicable to any storage system based on an RAID technology.

Figure 2:
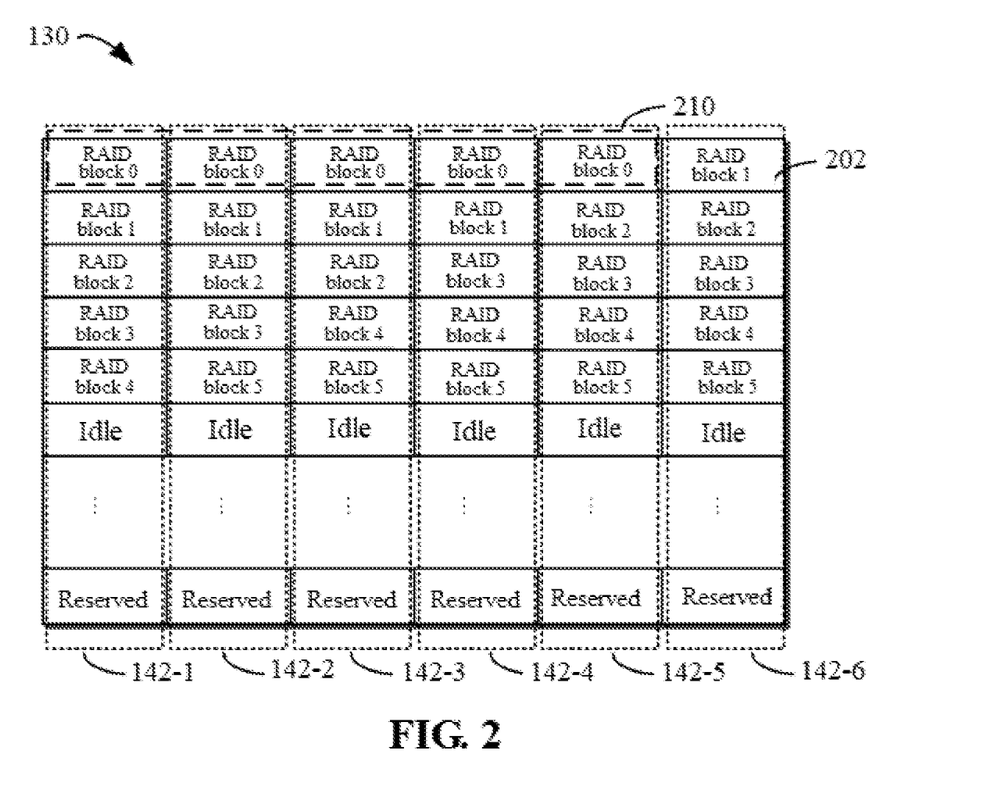
FIG. 2 shows a schematic diagram of an RAID consisting of a plurality of storage blocks from a plurality of storage disks according to the embodiments of the present disclosure.

In the RAID-based storage system, various RAID algorithms may be utilized to organize physical storage disks 142, including a traditional RAID algorithm and an architecture presently referred to as RAID 2.0. For a better understanding of the RAID-based storage system, FIG. 2 shows an example structure of RAID system 130. As shown in FIG. 2, storage disks 142 are divided into a plurality of storage blocks 202 (also referred to as disk extents or disk slices). Such division may be a logical division. Sizes of storage blocks 202 depend on sizes and division manners of the storage disks. In some examples, the sizes of storage blocks 202 may be at a gigabyte level. Certainly, other storage block sizes are also possible according to actual deployment needs.

RAID system 130 is constructed in units of storage blocks 202. In some dynamic allocation storage systems, when RAID system 130 is initially created, all the storage blocks are idle. As data is written, when the capacity of RAIDs is found to be insufficient, RAID system 130 will select a plurality of storage blocks 202 from different storage disks 142 using a certain algorithm and use these storage blocks 202 to constitute RAID blocks 210 of RAID system 130. Such RAID blocks 210 may be considered a small RAID, because I/O access and management of RAID blocks 210 are similar to those of a conventional RAID.

Storage blocks 202 may be selected from a plurality of storage disks 142 using any proper algorithms, such as a Round-Robin algorithm and a Weighted Round-Robin algorithm. The number of storage blocks included in each RAID 210 depends on the type of the RAID so as to provide different levels of data redundancy and recovery capabilities. The types of the RAIDs include RAID 2, RAID 3, RAID 4, RAID 5, RAID 6, RAID 7, RAID 10, etc. In FIG. 2 and the followings, for the purpose of explanation, the RAID 5 type is adopted to discuss the example embodiments of the present disclosure. However, it should be understood that the example embodiments of the present disclosure may be similarly applied to any other types of RAIDs.

In FIG. 2, according to the RAID 5 type, each RAID block 210 includes five storage blocks from different storage disks 142. As mentioned above, new RAID blocks 210 may be continuously allocated according to data writing needs, so that the capacity of RAID system 130 dynamically increases. FIG. 2 shows five RAID blocks 210 (i.e., RAID block 0 to RAID block 5) that have been allocated. In FIG. 2, in each storage block 202, "RAID block 0," "RAID block 1," "RAID block 2," "RAID block 3," "RAID block 4," or "RAID block 5" is used to mark the corresponding RAID block to which the storage block is allocated. Storage blocks 202 that are not selected as RAID blocks in each storage disk 142 are considered to be idle storage blocks 202 and are marked as "idle."

In some embodiments, one or more storage blocks 202 (marked as "reserved") may also be reserved in each storage disk 142. Conventionally, storage blocks 202 marked as "reserved" may be used for data reconstruction when disk failure occurs. For example, if one storage disk 142 fails, storage blocks 202 in storage disk 142 are all marked as failed, which means that RAID blocks 210 constructed based on these storage blocks 202 are also affected. Storage system 100 may initiate a reconstruction process to replace the storage blocks marked as failed in RAID blocks 210 with storage blocks 202 selected to be reserved, and data/information in the storage blocks marked as failed is reconstructed to reserved storage blocks 202. The reconstruction process may be initiated some time after the disk failure according to a reconstruction algorithm. The embodiments of the present disclosure are not limited in this respect.

Example Process

As discussed above, some storage disks in the storage system may fail at any time because the number of writing/erasing reaches the upper limit. In addition, because the RAID-based storage system always evenly allocates IO to all the storage disks, the plurality of storage disks may fail at the same time period, which further brings great data risks.

According to the embodiments of the present disclosure, there is provided a storage management solution. In this solution, expected usage time of a first storage disk in a set of storage disks is determined first. When it is determined that the expected usage time is less than a predetermined threshold value, data in a first storage block, associated with a first RAID, in the first storage disk is moved to a second storage block in a second storage disk in the set of storage disks. Then, the first storage block is replaced with the second storage block, so that the second storage block is associated with the first RAID. Based on this manner, data in storage disks with shorter remaining usage time may be migrated to other stable storage disks in advance, thereby improving the stability of the storage system.

Figure 3:
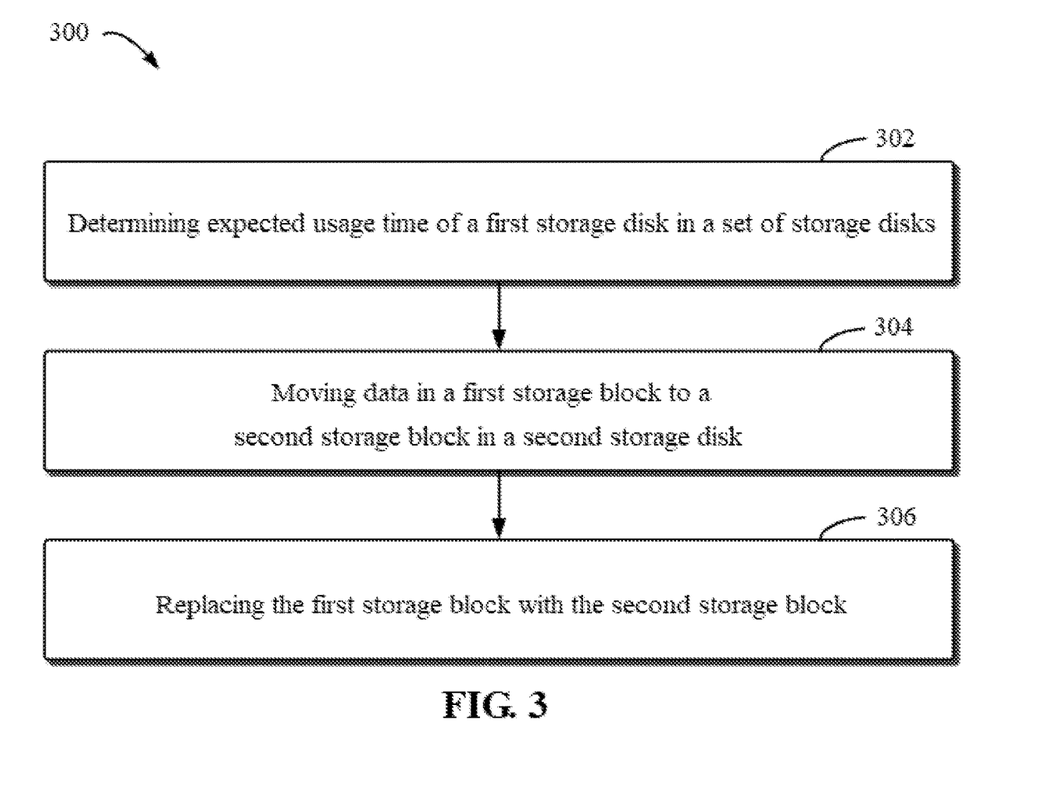
FIG. 3 illustrates a flowchart of a storage management process according to the embodiments of the present disclosure.

A storage management process according to the embodiments of the present disclosure will be described below with reference to FIG. 3. FIG. 3 shows a flowchart of storage management process 300 according to some embodiments of the present disclosure. Process 300 may be implemented, for example, by a management device used to manage storage system 100 shown in FIG. 1.

At block 302, expected usage time of a first storage disk in a set of storage disks is determined by the management device, wherein at least a part of the set of storage disks is configured to form at least one RAID. For example, for the example of FIG. 2, a set of storage disks 140 is configured to at least form a plurality of RAID blocks.

In some embodiments, the management device may determine the expected usage time through operating parameters of the storage disks. Specifically, the management device may determine used time and a degree of wear of the first storage disk. For example, for the example of FIG. 2, the management device may acquire the used time and the degree of wear of first storage disk 142-1 by acquiring a self-monitoring analysis and reporting technology (S.M.A.R.T.) parameter provided by all the storage disks. The used time represents the time that the storage disks have been running, and the degree of wear reflects a state of wear of the storage disks. For example, a value 0 may indicate that the storage disks are completely worn out, and a value 100 may indicate that the storage disks are in a unworn state.

Then, the management device may determine the expected usage time based on the used time and the degree of wear. Specifically, the management device, for example, may determine the expected usage time according to formula (1):

$$Hrem = \frac{Hon \times W_c}{100 - W_c} \qquad (1)$$

wherein Hrem indicates the expected usage time of the storage disk, Hon indicates the used time of the storage disk, and Wc indicates the degree of wear of the storage disk.

In some embodiments, the management device may determine, at a fixed period, the expected usage time of each storage disk in the set of storage disks. Additionally, when it is determined that the expected usage time of a particular storage disk is relatively short, the management device may shorten the period for determining the expected usage time of the storage disk. For example, when it is determined that the expected usage time of the storage disk is less than 720 hours, the management device may shorten the period from 7 days to 12 hours. Alternatively, when it is determined that the expected usage time of the storage disk is less than 240 hours, the management device may further shorten the period from 12 hours to 2 hours. Based on this manner, storage disks approaching service lives may be closely tracked, thereby improving the stability of the storage system.

It should be understood that the specific time and periods mentioned in the above examples are merely illustrative, and not restrictive to the present disclosure.

Figure 4:
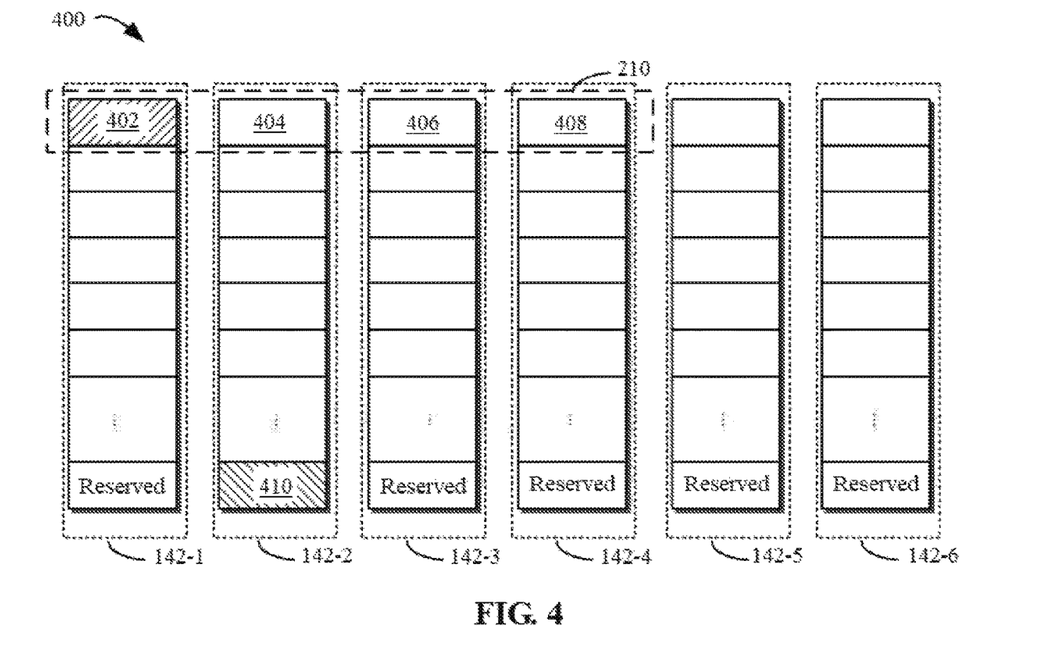
FIG. 4 shows a schematic diagram of storage management according to the embodiments of the present disclosure.

At block 304, data in a first storage block, associated with a first RAID in at least one RAID, in the first storage disk is moved to a second storage block in a second storage disk in the set of storage disks by the management device based on a determination that the expected usage time is less than a predetermined threshold value. The process of block 304 will be described below with reference to FIG. 4. FIG. 4 shows schematic diagram 400 of storage management according to the embodiments of the present disclosure.

As shown in FIG. 4, for example, when the management device determines that the expected usage time of first storage disk 142-1 is less than the predetermined threshold value, the management device may move data in storage block 402 in first storage disk 142-1 to storage block 410 in second storage disk 142-2. In some embodiments, second storage disk 142-2 may be, for example, a storage disk with the expected usage time exceeding certain data.

Specifically, when first storage disk 142-1 does not fail, the management device may allocate second storage block 410 in a reserved space of second storage disk 142-2. Then, the management device may move the data in first storage block 402 to second storage block 410.

In some embodiments, the management device may also mark second storage block 410 as to-be-restriped. Additionally, the management device may also recommend management between first storage block 402 and second storage block 410, such that first storage block 402 and second storage block 410 may respond to IO requests. Specifically, when an IO request for the first storage disk is received, the management device may perform an operation corresponding to the IO request at the first storage disk and the second storage disk at the same time. Based on this manner, the RAIDs may also normally respond to the IO requests during data migration, and ensure data consistency.

In some embodiments, when the data in first storage block 402 is copied to second storage block 410, first storage disk 142-1 may have failed. In this case, the data in first storage block 402 cannot be moved through data copying. In some embodiments, the management device may write the data in first storage block 402 into second storage block 410 through data reconstruction.

Specifically, when it is determined that first storage disk 142-1 fails, based on an RAID data redundancy mechanism, the management device may reconstruct the data in the first storage block by utilizing a storage block associated with first storage block 402 based on a determination that first storage disk 142-1 fails. For example, for the example of FIG. 4, the management device may use data in storage blocks 404, 406, and 408 to reconstruct the data in first storage block 402. Then, the management device may store the reconstructed data to second storage block 410.

In some embodiments, when it is determined that the expected usage time of first storage disk 142-1 is less than a threshold value, the management device may prevent allocation of a new storage block at first storage disk 142-1. Based on this manner, the storage block may be prevented from being allocated to a new RAID in storage disk 142-1, thereby reducing the number of IO requests to storage disk 142-1 and delaying the time of possible failure of the storage disk.

Continuing to refer to FIG. 3, at block 306, the management device replaces first storage block 402 with second storage block 410, so that the second storage block is associated with the first RAID.

Specifically, for the storage block marked as to-be-restriped, the management device may construct anew RAID block by restriping. For example, for the example of FIG. 4, the management device may disassociate RAID block 210 from storage block 402 by restriping, and associate RAID block 210 with storage block 410. Based on this manner, the management device may construct new RAID block 210.

In the case where first storage disk 142-1 has failed, the management device may replace first storage block 402 with second storage block 410 through the reconstruction process to construct the new RAID block.

In some embodiments, when all the storage blocks in first storage disk 142-1 have been accordingly replaced, the management device may mark first storage disk 142-1 as invalid, so that first storage disk 142-1 is removed from the set of storage disks 140.

Based on the manner discussed above, the embodiments of the present disclosure may move the data stored in a storage disk to the other storage disks in advance by determining that the storage disk is about to reach the usage time, and normal responses of the RAIDs to the IO requests will not be affected, so that the stability of the storage system is improved.

Example Device

Figure 5:
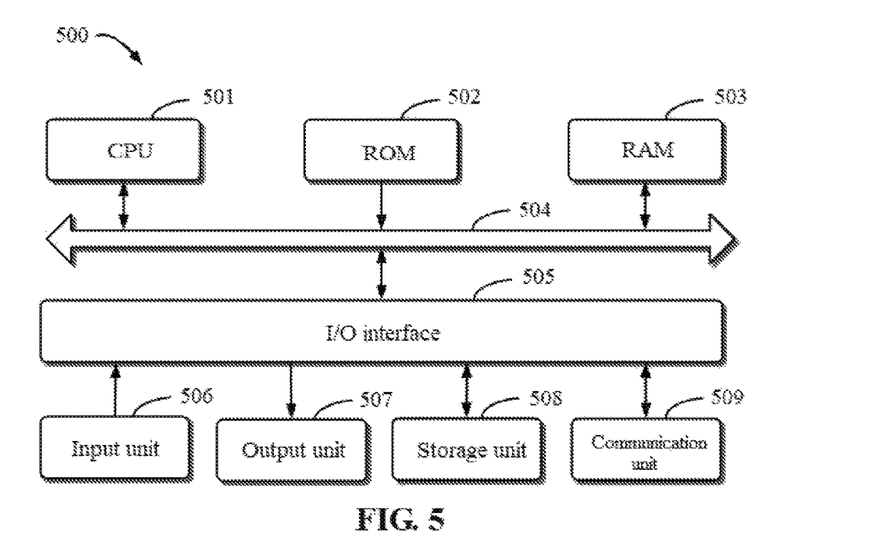
FIG. 5 illustrates a schematic block diagram of an example device which may be used to implement the embodiments of the content of the present disclosure.

FIG. 5 shows a schematic block diagram of example device 500 which may be used to implement the embodiments of the content of the present disclosure. For example, the management device of storage system 100 according to the embodiments of the present disclosure may be implemented by device 500. As shown in the figure, device 500 includes central processing unit (CPU) 501 which may perform various proper actions and processing according to computer program instructions stored in read only memory (ROM) 502 or computer program instructions loaded from storage unit 508 to random access memory (RAM) 503. RAM 503 may also store various programs and data necessary for operations of device 500. CPU 501, ROM 502, and RAM 503 are connected to each other by bus 504. Input/output (I/O) interface 505 is also connected to bus 504.

A plurality of members in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices over a computer network such as the Internet and/or various telecommunication networks.

The various processes and processing described above, such as method 300, may be performed by processing unit 501. For example, in some embodiments, method 300 may be implemented as a computer software program that is tangibly included in a machine-readable medium such as storage unit 508. In some embodiments, part of or all of computer programs may be loaded and/or installed onto device 500 via ROM 502 and/or communication unit 509. When the computer programs are loaded into RAM 503 and executed by CPU 501, one or more actions of method 300 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium can be a tangible device that can retain and store instructions for use by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a protrusions in a groove on which instructions are stored, and any suitable combination of the above. The computer-readable storage medium, as used herein, is not explained as transient signals themselves, such as radio waves or other freely propagating electromagnetic waves, electromagnetic waves propagating through waveguides or other transmission media (for example, light pulses propagating through a fiber-optic cable), or electrical signals transmitted through an electrical wire.

The computer-readable program instructions described here can be downloaded from the computer-readable storage medium to various computing/processing devices, or downloaded to an external computer or an external storage device over a network, e.g., the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object-oriented programming languages such as Smalltalk, C++, and the like, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, for example, a programmable logic circuit, a field-programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the method, the apparatus (the system), and the computer program product according to the embodiments of the present disclosure. It should be understood that each block of the flowcharts and/or block diagrams and combinations of various blocks in the flowcharts and/or block diagrams can be implemented by the computer-readable program instructions.

These computer-readable program instructions can be provided to a processing unit of a general-purpose computer, a special-purpose computer, or other programmable data processing apparatuses to produce a machine such that, when these instructions are executed by the processing unit of the computer or other programmable data processing apparatuses, an apparatus for implementing the functions/actions specified in one or more blocks in the flowcharts and/or block diagrams is produced. These computer-readable program instructions may also be stored in a computer-readable storage medium, and these instructions cause a computer, a programmable data processing apparatus, and/or other devices to work in a specific manner. Therefore, the computer-readable medium having instructions stored thereon includes an article of manufacture that includes instructions for implementing various aspects of the functions/actions specified in one or more blocks of the flowcharts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of instructions, which contains one or more executable instructions for implementing specified logical functions. In some alternative implementations, the functions noted in the blocks may also occur in an order different from that noted in the accompanying drawings. For example, two consecutive blocks may in fact be executed substantially concurrently, and they may also sometimes be executed in the reverse order, depending on the functions involved. It should also be noted that each block in the block diagrams and/or flowcharts and combinations of blocks in the block diagrams and/or flowcharts can be implemented with a dedicated hardware-based system that performs the specified functions or actions, or with a combination of dedicated hardware and computer instructions.

Various embodiments of the present disclosure have been described above. The foregoing description is illustrative rather than exhaustive, and is not limited to the disclosed embodiments. Multiple modifications and variations will be apparent to those skilled in the art without departing from the scope and spirit of the illustrated various embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A storage management method, comprising:
    determining expected usage time of a first storage disk in a set of storage disks, at least a part of the set of storage disks being configured to form at least one redundant array of independent disks (RAID);
    moving data in a first storage block, associated with a first RAID in the at least one RAID, in the first storage disk to a second storage block in a second storage disk in the set of storage disks based on a determination that the expected usage time is less than a predetermined threshold value; and
    replacing the first storage block with the second storage block, so that the second storage block is associated with the first RAID;

wherein moving the data in the first storage block to the second storage block in the second storage disk comprises:
allocating the second storage block in a reserved space of the second storage disk based on a determination that the first storage disk does not fail; and
moving the data in the first storage block to the second storage block.

2. The method of claim 1, wherein determining the expected usage time of the first storage disk in the set of storage disks comprises:
determining used time and a degree of wear of the first storage disk; and
determining the expected usage time based on the used time and the degree of wear.

3. The method of claim 1, further comprising:
preventing allocation of a new storage block at the first storage disk.

4. The method of claim 1, further comprising:
performing, in response to receiving an IO request for the first storage disk, an operation corresponding to the IO request at the first storage disk and the second storage disk at the same time.

5. The method of claim 1, further comprising:
marking the first storage disk as invalid based on a determination that storage blocks in the first storage disk have all been replaced with corresponding storage blocks.

6. The method of claim 1, wherein determining expected usage time includes:
calculating the expected usage time at a predetermined rate; and
in response to the expected usage time being below a second predetermined threshold, adjusting the predetermined rate.

7. A storage management method, comprising:
determining expected usage time of a first storage disk in a set of storage disks, at least a part of the set of storage disks being configured to form at least one redundant array of independent disks (RAID);
moving data in a first storage block, associated with a first RAID in the at least one RAID, in the first storage disk to a second storage block in a second storage disk in the set of storage disks based on a determination that the expected usage time is less than a predetermined threshold value; and
replacing the first storage block with the second storage block, so that the second storage block is associated with the first RAID;
wherein moving the data in the first storage block to the second storage block comprises:
reconstructing the data in the first storage block by utilizing a storage block associated with the first storage block based on a determination that the first storage disk fails; and
storing the reconstructed data to the second storage block.

8. An electronic device, comprising:
at least one processing unit; and
at least one memory coupled to the at least one processing unit and storing instructions for execution by the at least one processing unit, wherein the instructions, when executed by the at least one processing unit, cause the device to perform actions, and the actions comprise:
determining expected usage time of a first storage disk in a set of storage disks, at least a part of the set of storage disks being configured to form at least one RAID;
moving data in a first storage block, associated with a first RAID in the at least one RAID, in the first storage disk to a second storage block in a second storage disk in the set of storage disks based on a determination that the expected usage time is less than a predetermined threshold value; and
replacing the first storage block with the second storage block, so that the second storage block is associated with the first RAID;
wherein moving the data in the first storage block to the second storage block in the second storage disk comprises:
allocating the second storage block in a reserved space of the second storage disk based on a determination that the first storage disk does not fail; and
moving the data in the first storage block to the second storage block.

9. The electronic device of claim 8, wherein determining the expected usage time of the first storage disk in the set of storage disks comprises:
determining used time and a degree of wear of the first storage disk; and
determining the expected usage time based on the used time and the degree of wear.

10. The electronic device of claim 8, wherein the actions further comprise:
preventing allocation of a new storage block at the first storage disk.

11. The electronic device of claim 8, wherein the actions further comprise:
performing, in response to receiving an IO request for the first storage disk, an operation corresponding to the IO request at the first storage disk and the second storage disk at the same time.

12. The electronic device of claim 8, wherein the actions further comprise:
marking the first storage disk as invalid based on a determination that storage blocks in the first storage disk have all been replaced with corresponding storage blocks.

13. An electronic device, comprising:
at least one processing unit; and
at least one memory coupled to the at least one processing unit and storing instructions for execution by the at least one processing unit, wherein the instructions, when executed by the at least one processing unit, cause the device to perform actions, and the actions comprise:
determining expected usage time of a first storage disk in a set of storage disks, at least a part of the set of storage disks being configured to form at least one RAID;
moving data in a first storage block, associated with a first RAID in the at least one RAID, in the first storage disk to a second storage block in a second storage disk in the set of storage disks based on a determination that the expected usage time is less than a predetermined threshold value; and
replacing the first storage block with the second storage block, so that the second storage block is associated with the first RAID;

wherein moving the data in the first storage block to the second storage block comprises:
reconstructing the data in the first storage block by utilizing a storage block associated with the first storage block based on a determination that the first storage disk fails; and
storing the reconstructed data to the second storage block.

14. A computer program product having a non-transitory computer readable medium which stores a set of instructions to perform storage management; the set of instructions, when carried out by computerized circuitry, causing the computerized circuitry to perform a method of:
determining expected usage time of a first storage disk in a set of storage disks, at least a part of the set of storage disks being configured to form at least one redundant array of independent disks (RAID);
moving data in a first storage block, associated with a first RAID in the at least one RAID, in the first storage disk to a second storage block in a second storage disk in the set of storage disks based on a determination that the expected usage time is less than a predetermined threshold value; and
replacing the first storage block with the second storage block, so that the second storage block is associated with the first RAID;
wherein moving the data in the first storage block to the second storage block in the second storage disk comprises:
allocating the second storage block in a reserved space of the second storage disk based on a determination that the first storage disk does not fail; and
moving the data in the first storage block to the second storage block.

15. The computer program product of claim 14, wherein determining the expected usage time of the first storage disk in the set of storage disks comprises:
determining used time and a degree of wear of the first storage disk; and
determining the expected usage time based on the used time and the degree of wear.

16. The computer program product of claim 14, wherein the method further comprises:
preventing allocation of a new storage block at the first storage disk.

17. The computer program product of claim 14, wherein the method further comprises:
performing, in response to receiving an IO request for the first storage disk, an operation corresponding to the IO request at the first storage disk and the second storage disk at the same time.

18. The computer program product of claim 14, wherein the method further comprises:
marking the first storage disk as invalid based on a determination that storage blocks in the first storage disk have all been replaced with corresponding storage blocks.

* * * * *